United States Patent [19]

Chang

[11] Patent Number: 5,558,190

[45] Date of Patent: Sep. 24, 1996

[54] DAMPING DEVICE ADAPTED FOR USE IN EXERCISE APPARATUS

[76] Inventor: John Chang, No. 1-2, Lane 975, Chun-Jih Road, Tao-Yuan City, Taiwan

[21] Appl. No.: 540,018

[22] Filed: Oct. 6, 1995

[51] Int. Cl.⁶ .................................................. F16F 9/50
[52] U.S. Cl. .................. 188/312; 188/285; 188/316; 188/322.13; 188/322.19; 188/322.22; 482/112; 267/120; 267/64.11
[58] Field of Search ................... 188/311, 312, 188/313, 316, 281, 282, 322.13, 322.22, 299, 322.19, 319, 286, 287, 314, 315, 284, 285, 270; 482/112, 113; 267/64.11–64.28, 120, 124, 114, 113, 118, 227; 16/66, 84

[56] References Cited

U.S. PATENT DOCUMENTS

| | | | |
|---|---|---|---|
| 1,313,763 | 8/1919 | Thomas | 188/287 |
| 2,354,340 | 7/1944 | Utter | 188/318 |
| 3,107,753 | 10/1963 | Georgetta | 188/312 |
| 3,174,343 | 3/1965 | Kasulis | 482/112 |
| 3,207,270 | 9/1965 | Ellis, Jr. | 188/287 |
| 3,260,515 | 7/1966 | Albers | 188/287 |
| 3,944,221 | 3/1976 | Berkestad et al. | 482/112 |
| 4,133,415 | 1/1979 | Dressell, Jr. et al. | 188/287 |
| 4,164,274 | 8/1979 | Schupner | 188/287 |
| 4,693,454 | 9/1987 | Tsuchiya et al. | 16/66 |
| 4,700,611 | 10/1987 | Kaneko | 188/286 |
| 4,880,230 | 11/1989 | Cook | 482/113 |
| 5,069,317 | 12/1991 | Stoll et al. | 188/286 |
| 5,220,206 | 6/1993 | Bivens | 16/66 |

FOREIGN PATENT DOCUMENTS

| | | | |
|---|---|---|---|
| 3900927 | 7/1990 | Germany | 16/66 |
| 1516658 | 10/1989 | U.S.S.R. | 188/285 |

*Primary Examiner*—Douglas C. Butler
*Attorney, Agent, or Firm*—Morton J. Rosenberg; David I. Klein

[57] ABSTRACT

A damping device adapted for use in exercise apparatus includes a cylinder with internally threaded front and and rear end portions, a front cylinder cover and a rear cylinder cover, each of which has a threaded raised portion for engaging the internal threads of the cylinder and a central through hole as well as a valve hole in an upper side thereof; two valves respectively disposed in the valve holes of the cylinder covers; two C-clips for positioning the valve bodies inside the valve holes; a piston located inside the cylinder; a tube fixedly secured to the upper sides of the cylinder covers; a regulating rod disposed inside the tube and provided with valves for cooperating with vents in the bottom side of the tube, spring being fitted to a rear end thereof; and a stop element for controlling the displacement of the regulating rod inside the tube. The damping device does not require damping oil and permits regulation of the desired damping force.

3 Claims, 9 Drawing Sheets

5,558,190

DAMPING DEVICE ADAPTED FOR USE IN EXERCISE APPARATUS

BACKGROUND OF THE INVENTION (a) Field of the Invention

The present invention relates generally to a damping device for exercise apparatus, and more particularly to a damping device which does not require damping oil and which allows regulation of the damping resistance.

(b) Description of the Prior Art

Conventional exercise apparatus, such as steppers, exercise bikes, muscle trainers, etc., are generally provided with damping devices to achieve desired exercise effects or to ensure normal operation of the apparatus. Electromagnetic control devices, hydraulic cylinders or suspended weights are generally adopted as damping devices. However, since electromagnetic control devices are space occupying and require use of motors and electric power sources, they have limited applications. Suspended weights are also bulky and inconvenient. Hydraulic cylinders which are small in size and inexpensive have been widely used as damping devices. However, since hydraulic cylinders require damping oil, which may easily leak after a period of use, and the leaked oil may stain the carpets or floors, they are becoming less popular. Improvement on damping. devices for exercise apparatus is therefore necessary.

SUMMARY OF THE INVENTION

A primary object of the present invention is to provide a damping device adapted for use in exercise apparatus, in which a piston within a cylinder is used to compress air in the cylinder to generate damping resistance, eliminating the need for damping oil as in the prior art.

Another object of the present invention is to provide a damping device adapted for use in exercise apparatus comprising a cylinder having two valves capable of displacement therein, said valves being capable of displacement with the reciprocating movement of a piston in the cylinder so that two action bars at both ends of the piston may be used to generate damping resistance. A further object of the present invention is to provide a damping device adapted for use in exercise apparatus, in which a piston has only a single action bar to provide a unidirectional damping resistance. Still another object of the present invention is to provide a damping device adapted for use in exercise apparatus which permits regulation of the damping resistance.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
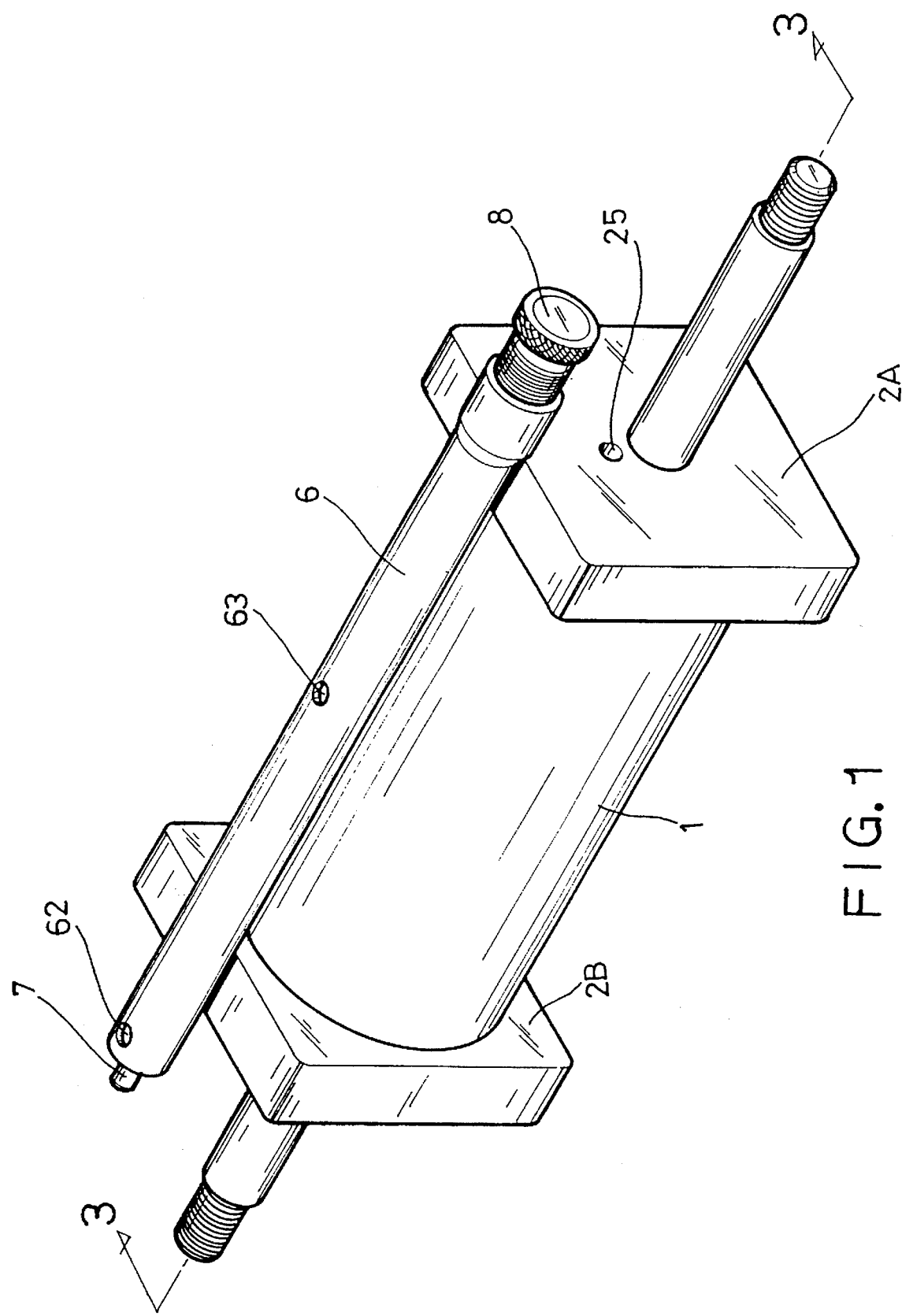
FIG. 1 is an outer view of a preferred embodiment of the damping device of the present invention.
Figure 2:
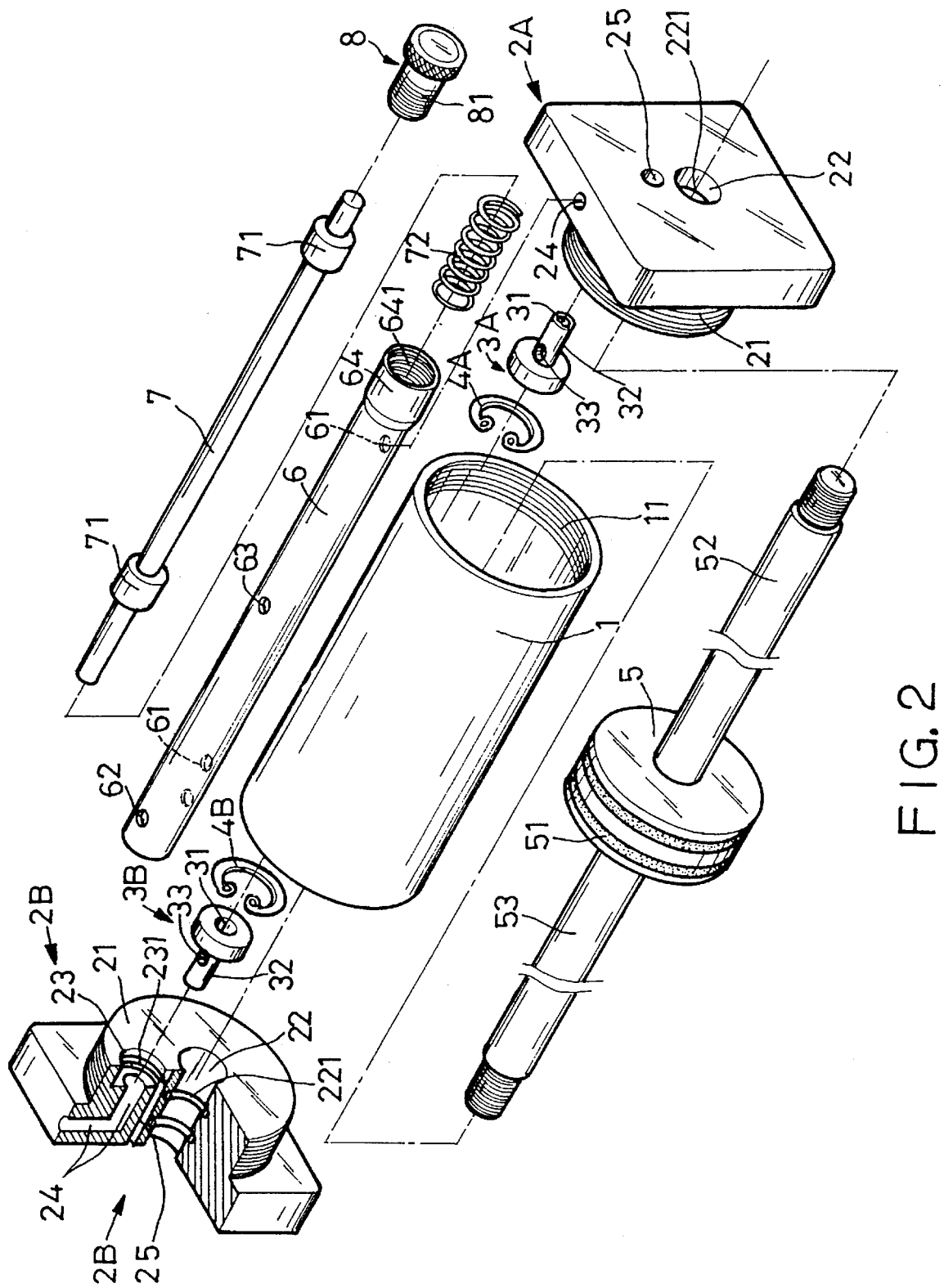
FIG. 2 is an exploded view of the preferred embodiment of the present invention.
Figure 3:
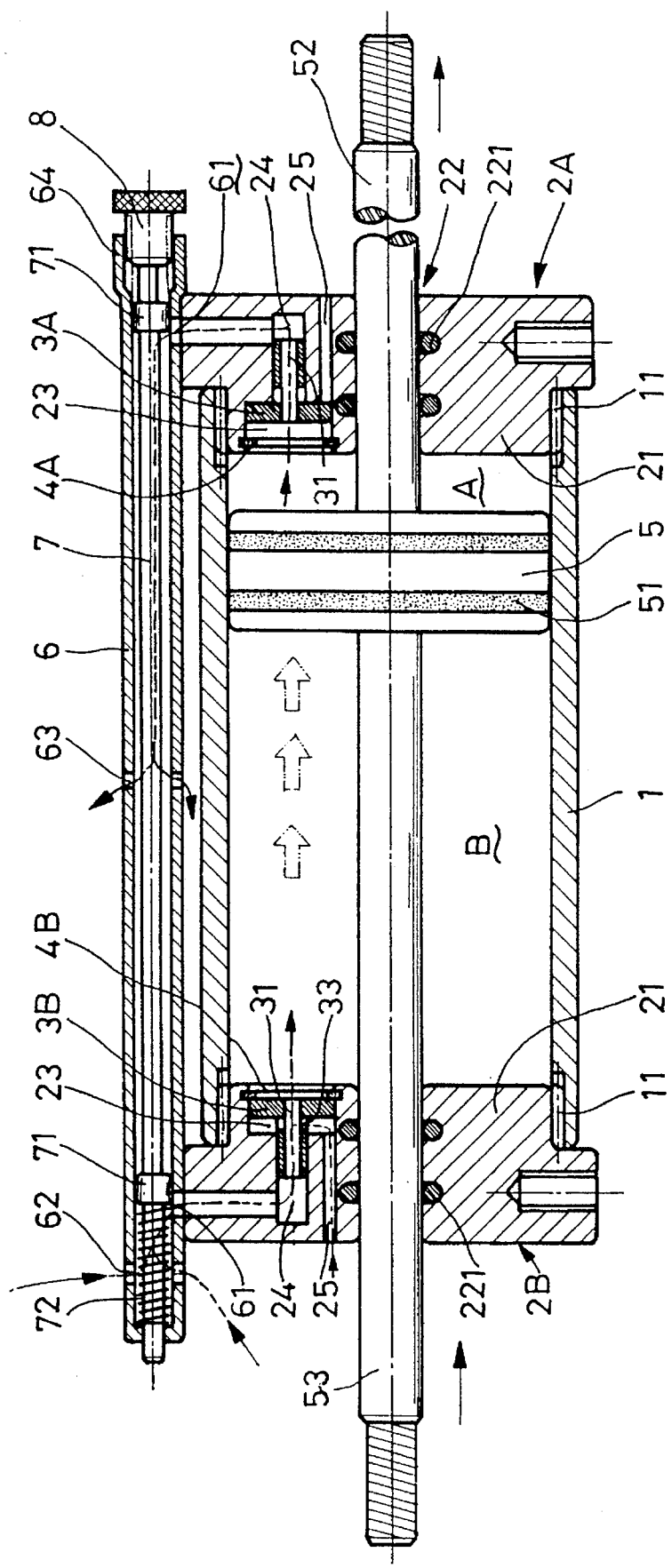
FIG. 3 is a sectional view of the preferred embodiment of the present invention.

With reference to FIGS. 1, 2 and 3, the damping device according to the present invention essentially comprises a cylinder 1, a front cylinder cover 2A and a rear cylinder cover 2B, a first valve 3A and a second valve 3B, a first C-clip 4A and a second C-clip 4B, a piston 5, a tube 6, a regulating rod 7, and a stop element 8.

The cylinder has internal threads 11 provided at a front end and a rear end thereof. The front cylinder cover 2A and the rear cylinder cover 2B are respectively provided at the front and the rear ends of the cylinder, each of which has a threaded raised portion 21 provided on an inner side thereof for engaging the internal threads 11 of the cylinder 1 and is provided with an axial through hole 22 in the center thereof. The through hole 22 has a plurality of oil seals 221 disposed therein, and a valve hole 23 is formed in the cylinder cover 2A (2B) near the through hole 22. The valve hole 23 communicates with a first vent 24 which opens in an upper side of the cylinder cover 2A (2B) and a second vent 25 which opens in an outer side of the cylinder cover 2A (2B).

The first valve 3A and the second valve 3B are respectively disposed in the valve holes 23 of the front cylinder cover 2A and the rear cylinder cover 2B. Each of the valves 3A and 3B has an axial through hole 31 which is connected to a tube 32 of a smaller diameter on the outer side of the valve. The tube 32 may be fitted into the first vent 24 and is provided with a longitudinally oriented through hole 33 in an upper rear side thereof.

The C-clips 4A and 4B are respectively used to position the first valve 3A and the second valve 3B within the valve holes 23.

The piston 5 is disposed within the cylinder 1. Its outer periphery is insertably provided with oil seals 51 and its two ends respectively extend to form a first action bar 52 and a second action bar 53, which respectively pass through the through holes 22 of the front cylinder cover 2A and the rear cylinder cover 2B.

The tube 6 has its front and rear ends fixedly secured at the upper sides of the front cylinder cover 2A and the rear cylinder cover 2B respectively. The tube 6 is provided with vents 61 in its bottom side for communicating with the first vents 24 in the cylinder covers 2A and 2B. The tube 6 is also provided with through holes 62 and 63 near its upper rear portion and upper middle portion.

The regulating rod 7 is disposed within the tube 6 and has a couple of valves 71 located at suitable positions such that they communicate with the vents 61 in the bottom side of the tube 6 near its ends. A spring 72 is fitted at a rear end of the regulating rod 7 behind one of the valves 71.

The stop element 8 is fitted on a front end portion of the regulating rod 7 for positioning the regulating rod within the tube 6 and controlling the displacement of the regulating rod 7 therein.

The damping device of the present invention consisting of the above-described structural elements eliminates the need for damping oil and permits adjustment of the damping force.

Figure 4:
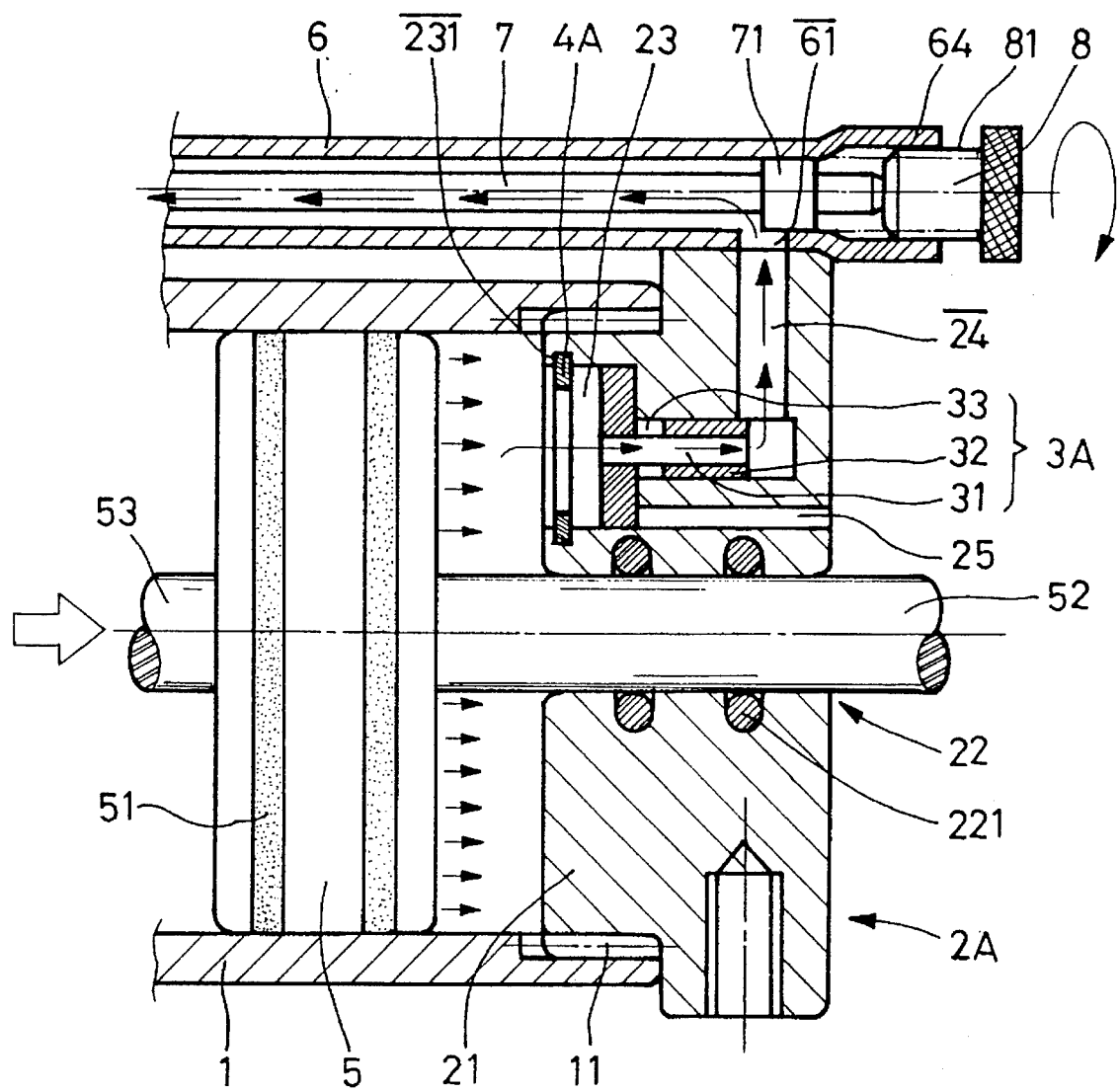
FIG. 4 is a schematic view of the damping device in part, illustrating the path of air.

Assembly of the damping device according to the present invention will now be described by making reference to FIGS. 3 and 4. The piston 5 is firstly disposed within the cylinder 1, and the front cylinder cover 2A and the rear cylinder cover 2B are secured in place. Before securing the cylinder covers 2A and 2B to the cylinder 1, the valves 3A and 3B are fitted into their corresponding valve holes 23, and the C-clips 4A and 4B are inserted into grooves 231 of the corresponding valve holes 23 for positioning and retaining the valves 3A and 3B within their valve holes 23, so that the valves 3A and 3B may be restricted to displace within their valve holes 23. The vents 61 of the tube 6 are then respectively brought into alignment with the vents 24 in the upper sides of the cylinder covers 2A and 2B. Lastly, the spring 72 and the regulating rod 7 are inserted into the tube 6 one by one, and the stop element 8 is fitted in place to secure the regulating rod 7 inside the tube 6.

The above-mentioned stop element 8 may be a regulating screw as shown in FIG. 1 and has external threads 81 for engaging an internally threaded outlet 641 of the tube 6. Alternatively, a stop rope on an exercise apparatus may be utilized to connect directly with the damping device of the invention, depending on the type of exercise apparatus on which the invention is used. In this preferred embodiment, control of the displacement of the regulating rod 7 may be achieved by turning the regulating screw.

The principle of operation and the operation of the damping device of the invention will be illustrated below with reference to FIGS. 3, 4 and 5. The two action bars 52 and 53 of the piston 5 protrude from the through holes 22 of the front cylinder cover 2A and the rear cylinder cover 2B. It should be understood that the actions bars 52 and 53 may be connected to driving elements (not shown) of an exercise apparatus for generating damping force. As shown in FIG. 3, when the action bar 53 exerts a force on the interior of the cylinder 1, the piston 5 pushes forwardly, which causes the air in a zone A to be compressed, which in turn causes the valve 3A of the front cylinder cover 2A to push forwardly to be closed against the bottom side of the valve hole 23, further closing the second vent 25, so that the air can only flow through the through hole 31 in the middle of the valve 3A via the first vent 24 into the tube 6 through the vent 61 and out through the vent 63 in the middle portion of the tube 6. Therefore, when the action bar 53 is caused to push the piston 5 to displace forwardly to compress the air, a damping resistance will be produced, and the size of the damping resistance thus produced is determined by the amount of the air flow from zone A of the cylinder 1. When the stop element 8 rotates, forcing the regulating rod 7 in the tube 6 to displace, the vents 61 of the tube 6 may be completely or partly sealed by the valves 71 of the regulating rod 7. If the valves 71 completely close the vents 61, air flow from zone A of the cylinder 1 will be completed blocked, and the action bar 53 may achieve the maximum damping resistance with its forward pushing movement. Reversely, if the valves 71 of the regulating rod 7 are caused to displace away from the vents 61 due to the action of the stop element 8, the air in zone A of the cylinder 1 will be compressed as a result of the forward displacement of the piston 5 and will flow out in considerable amount. Hence, the action bar 53 will achieve a minimum damping resistance. Therefore, by utilizing the valves 71 of the regulating rod 7 to control the closing or opening of the vents 61, the desired damping resistance may be achieved. And since the rear end of one of the valves 71 is fitted with the spring 72, when the stop element 8 displaces inwardly in the threaded outlet 64 of the tube 6, the spring 72 will be pressed so that, when the stop element 8 displaces outwardly, the spring 72 will compel the regulating rod 7 to synchronously displace outwardly. By means of such an arrangement, the valves 71 of the regulating rod 7 may be utilized to control the size of the vents 61, achieving regulation of the desired damping resistance.

Furthermore, as shown in FIG. 3, when the piston 5 compresses the air in zone A of the cylinder 1 to generate the damping resistance, a suction force will be relatively produced in a zone B. Hence the valve 3B in the valve hole 23 of the rear cylinder cover 2b will be caused by the suction force to displace forwardly, opening the second vent 25. Air is consequently drawn in through the second vent 25 through the through hole 33 of the valve 3B via the through hole 31 into zone B of the cylinder 1. At this time, if the valves 71 of the regulating 7 does not completely close the vents 61, air will also be drawn in via the through hole 62 in the upper rear portion of the regulating rod 7 and through the first vent 24 into the through hole 31 of the valve 3B where it meets the air from the second vent 25 to flow together into the cylinder 1. At this time, if the valves 71 of the regulating rod 7 completely close the through holes 61, air will flow in through the second vent 25 so that the action bar 53 becomes slack and instantly stops, hence there will not occur any reverse action in the cylinder as in the prior art.

Figure 5:
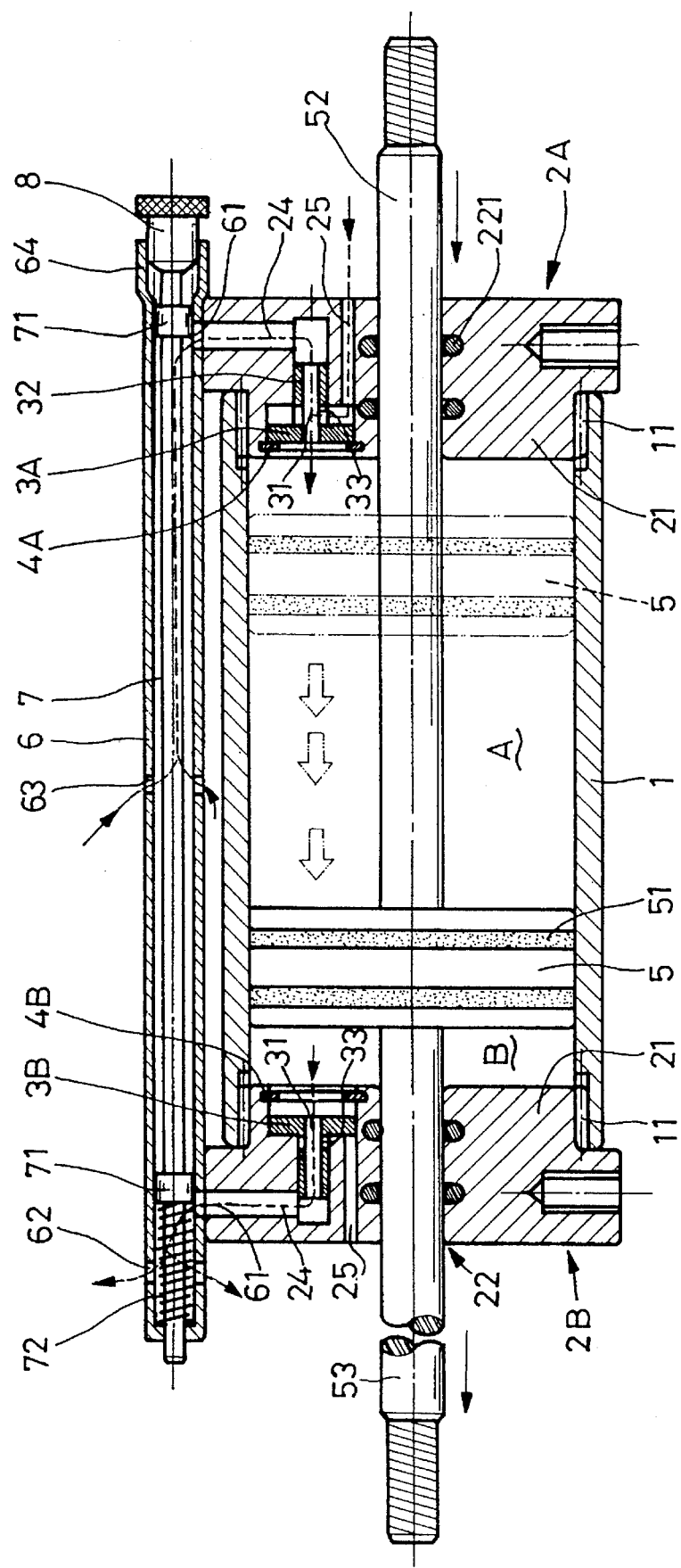
FIG. 5 is a schematic view of the present invention, showing displacement of the piston in FIG. 3 in a reverse direction.

Referring to FIG. 5, when the action bar 53 pushes the piston 5 forwardly to the end of zone A and stops, and the action bar 52 subsequently pushes the piston 5 backwardly in a reverse direction, the valve 3A which is previously subjected to compression is instantly subjected to a suction force, so that the valve 3A detaches from the bottom side of valve hole 23, causing the second vent 25 to open. Air is therefore drawn in via the second vent 25 into zone A in the cylinder 1 to cancel the reverse action in the cylinder 1. For the same reason, at this time, the first vent 24 in the front cylinder cover 2A is not completely closed by the valve 71 of the regulating bar 7, air entered via the through hole 63 in the upper middle portion of the tube 6 may be sucked in. Likewise, the instant when the piston 5 changes its direction of displacement, the valve 3A will be in an open state, while the valve 3B is under the compression of the compressed by air in zone B, so that it lies close against the bottom side of the valve hole of the rear cylinder cover 2B, closing the second vent 25, so that air in zone B may only flow through the through hole 31 of the valve 3B into the first vent 24 through the through hole 61 into the tube 6 and finally out via the through hole 62 in the upper rear portion of the tube 6. However, if the valve 71 of the regulating rod 7 completely closes the through hole 61 and the first vent 24, the air in zone B will be completely obstructed. At this time, when the action bar 52 pushes the piston 5 to displace forwardly to compress air in zone B, a maximum damping resistance will be generated.

Figure 6:
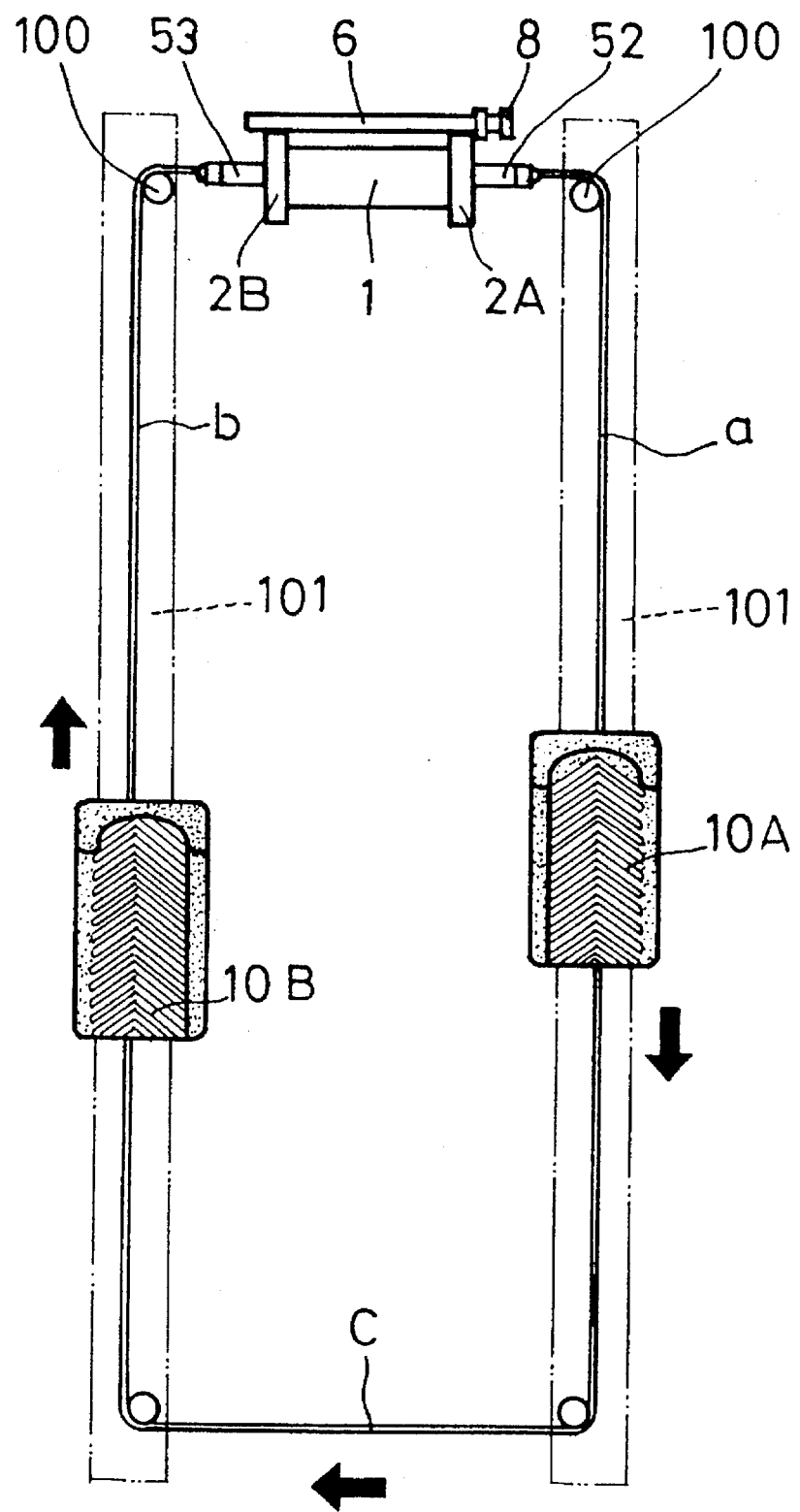
FIG. 6 is a schematic view of the damping device of the present invention adapted for use in an exercise apparatus.

In view of the aforesaid, the damping device according to the present invention is an excellent one. The reciprocating displacement of the action bars 52 and 53 may achieve the desired damping resistance. Reference is made to FIG. 6, which shows an exercise stepper of a ski training apparatus. The action bars 52 and 53 of the damping device of the invention are connected by means of cables a and b respectively wound round a couple of pulleys to a right foot pedal 10A and a left foot pedal 10B at their front ends. The rear ends of the foot pedals 10A and 10B are connected by means of a cable c. The foot pedals may slide back and forth along a rail 101. When the right foot pedal 10A slides backwardly, the cable a will pull the action bar 52, so that the right foot of the user will be subjected to a damping resistance, as in real skiing. At this time, due to the connection of the cables a, b and c, the left foot pedal 10B will also be caused to displace, pulling the action bar 52 to generate a damping resistance. Conversely, when the left foot of the user exerts a force, the action bar 53 will be pulled by the cable b to produce a damping resistance. By means of such an arrangement, the alternate reciprocating movement of the right and left foot pedals 10A and 10B will cause the action bars 52 and 53 to reciprocate, achieving the desired exercising effects.

Figure 7:
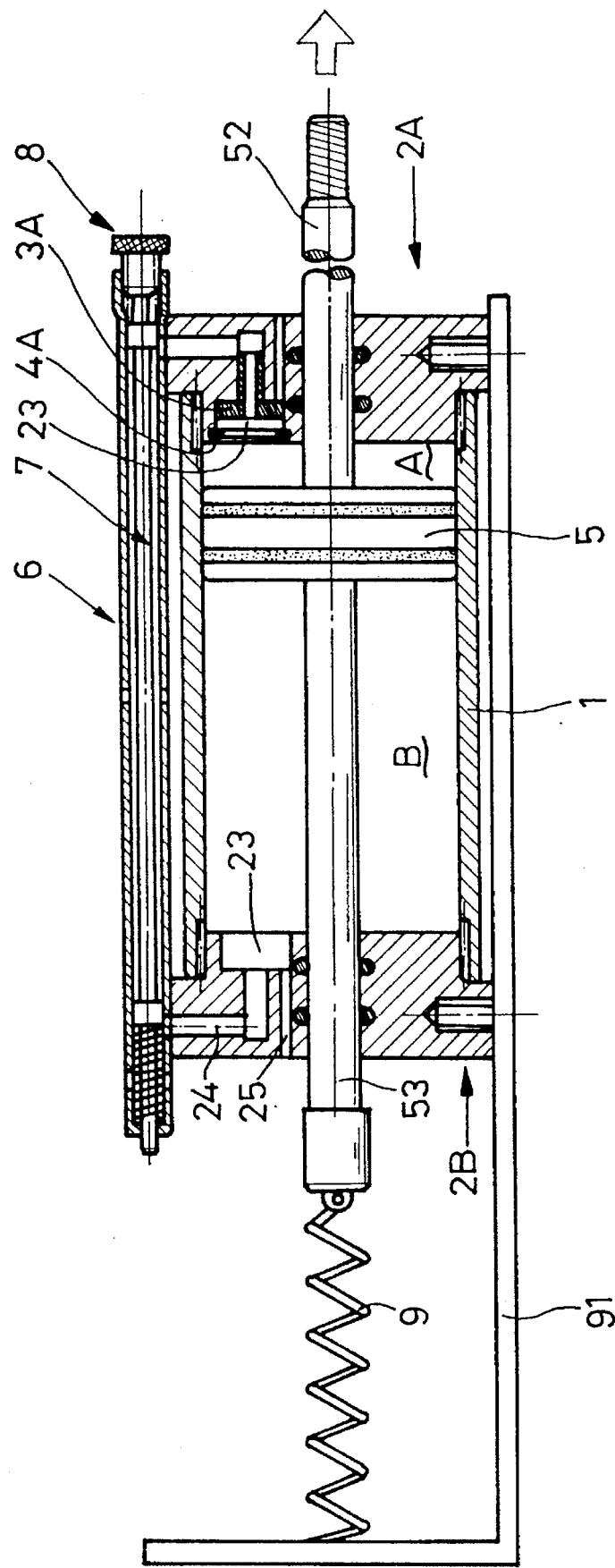
FIG. 7 illustrates a second preferred embodiment of the present invention.
Figure 8:
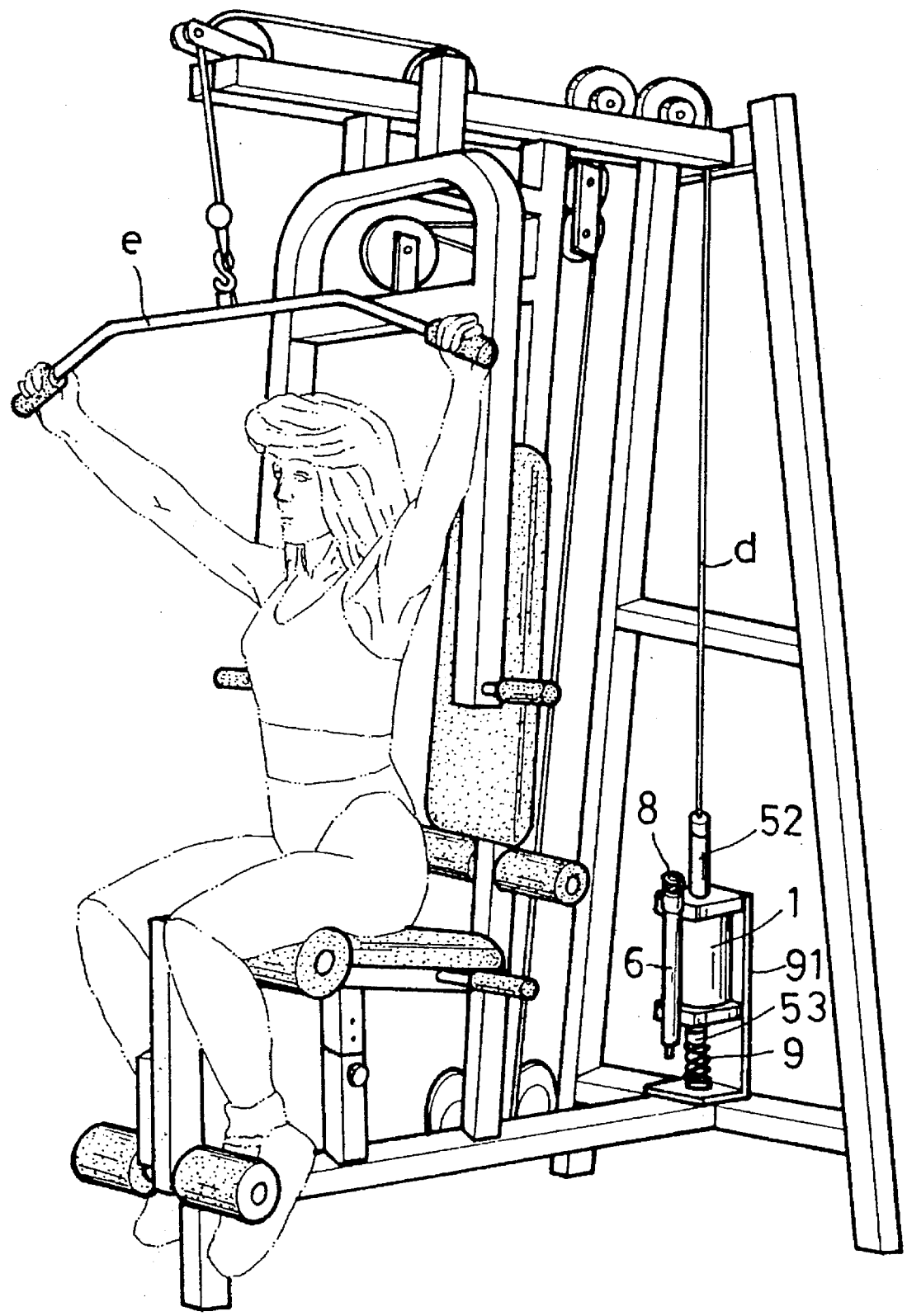
FIG. 8 shows the damping device of the invention adapted for use in a muscle training apparatus.

Obviously, when the damping device of the invention is adapted for use in an exercise apparatus to generate a unidirectional damping resistance, one of the valves 3A, 3B may be removed. As shown in FIG. 7, which shows another preferred embodiment of the invention, the valve 3B in the rear cylinder cover 2B is removed, so that the valve hole 23 may communicate with the second vent 25 all the time. And when the first vent 24 is not closed, it will also communicate with the valve hole 23. Therefore, when the action bar 52 is pulled forwardly, the piston 5 will compress the air in zone A to produce a damping resistance. But when the action bar 52 is released, there is not any action force, so that the piston 5 returns to its original position. Therefore, a rear end of the action bar 53 is connected to one end of a spring 9 which has the other end thereof connected to a frame 91. When the action bar 52 displaces forwardly to a first position, the piston 5 will be quickly pulled backwardly to a second position since there is not any damping resistance in zone B when the action bar 52 is released. Hence, the damping device of the invention may be adapted on a muscle training apparatus as shown in FIG. 8. When the user pulls a handle e, a cable d will pull the action bar 52 upwardly to generate a damping resistance, and when the user releases the handle e, the action bar 53 will be quickly pulled back by the spring 9 to its original position, so that the cable d pulls the handle e upwardly. By means of such upward and downward movements provided by the damping device of the invention, desired exercising effects may be achieved.

Figure 9:
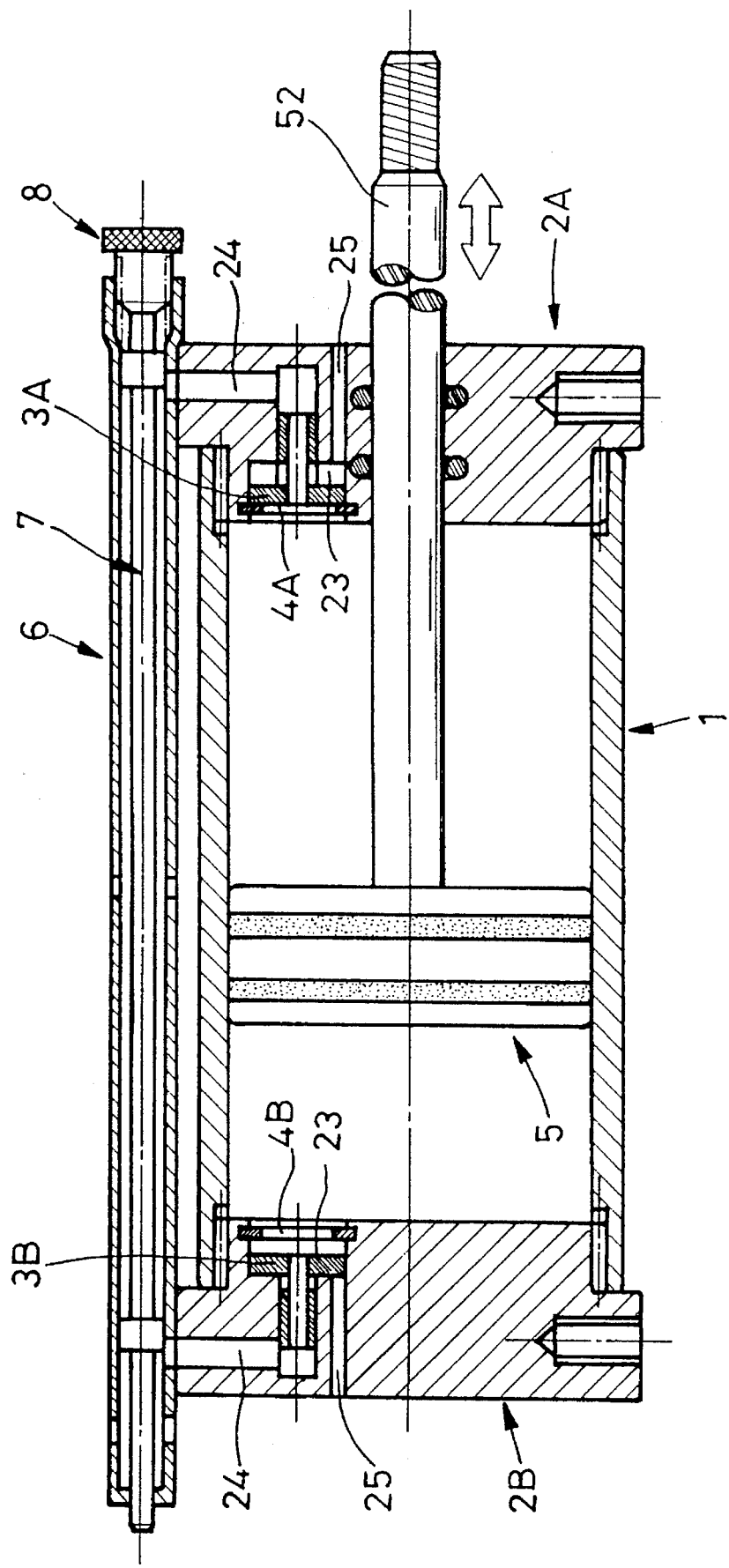
FIG. 9 illustrates a third preferred embodiment of the present invention.

FIG. 9 shows a third preferred embodiment of the present invention, in which the piston 5 has only one action bar 52 for matching various types of exercise apparatus. The action principle thereof is similar to that illustrated in FIG. 3 and will not be described in detail herein. In addition, one of the valves 3A and 3B may be removed as desired to generate a unidirectional damping resistance.

The damping device of the invention has the following advantages:

1. The damping device of the invention eliminates use of damping oil in conventional hydraulic cylinders to generate damping resistance. Instead, the physical properties of air compression is exploited to produce the desired damping effects, obliterating the problem of oil leakage.
2. The amount of air flow may be controlled by means of the regulating rod 7 in the tube 6 and the stop element 8 so as to provide damping resistance of various degrees.
3. Optionally, one valve may be provided in either one of the cylinder covers to achieve a unidirectional damping effect.

Although the present invention has been illustrated and described with reference to the preferred embodiment thereof, it should be understood that it is in no way limited to the details of such embodiment but is capable of numerous modifications within the scope of the appended claims.

What is claimed is:

1. A damping device adapted for use in exercise apparatus, comprising:

a cylinder, having an internally threaded front end and an internally threaded rear end;

a front cylinder cover and a rear cylinder cover, each of which has a threaded raised portion provided on an inner side thereof for engaging said threaded front end or said threaded rear end of said cylinder and is provided with an axial through hole formed in a central portion thereof, said axial through hole having a plurality of oil seals disposed therein, said front cylinder cover and said rear cylinder cover each having a valve hole formed near its corresponding axial through hole, said valve hole in both of said front cylinder cover and said rear cylinder cover communicating with a first vent which opens in an upper side of said cylinder cover and a second vent which opens in an outer side of said cylinder cover;

a first valve disposed in said valve hole of said front cylinder cover and a second valve disposed in said valve hole of said rear cylinder cover, each of said valves having an axial through hole connected to a first tube of a smaller diameter on an outer side thereof, said first tube being fitted into said first vent and being provided with a longitudinally oriented through hole in an upper rear side thereof;

a first C-clip and a second C-clip for positioning said first valve and said second valve within their corresponding valve holes;

a piston disposed within said cylinder and having an outer periphery insertably provided with a plurality of oil seals, both ends of said piston extending to form a first action bar and a second action bar, which respectively pass through said axial through holes in said front cylinder cover and said rear cylinder cover;

a second tube having a front end and rear end fixedly secured at respective upper sides of said front cylinder cover and said rear cylinder cover, said second tube being provided with a plurality of vents formed in its bottom side for communicating with said first vents in said front cylinder cover and said rear cylinder cover, said second tube further having through holes formed near its upper rear portion and upper middle portion;

a regulating rod disposed within said second tube and having a pair of valve elements located at suitable positions such that they communicate with said vents in the bottom side of said second tube, a spring being fitted at a rear end of said regulating rod behind one of said pair of valve elements;

a stop element fitted on a front end portion of said regulating rod for positioning said regulating rod in said second tube and controlling displacement of the regulating rod therein.

2. A damping device adapted for use in exercise apparatus, comprising:

a cylinder, having an internally threaded front end and an internally threaded rear end;

a pair of cylinder covers, each of said pair of cylinder covers having a threaded raised portion provided on an inner side thereof for engaging a respective one of said threaded front and rear ends of said cylinder, each of said pair of cylinder covers being provided with (1) an axial through hole formed in a central portion thereof and having a plurality of oil seals disposed therein, (2)

a first vent which opens in an upper side of said cylinder cover, (3) a second vent which opens in an outer side of said cylinder cover, and (4) a valve hole formed near said axial through hole and communicating with said first and second vents;

a valve disposed in said valve hole of one of said cylinder covers, said valve having an axial through hole connected to a first tube of a smaller diameter on an outer side thereof, said first tube being fitted into said first vent and being provided with a longitudinally oriented through hole in an upper rear side thereof;

a C-clip for positioning said valve within said valve hole of said one cylinder cover;

a piston disposed within said cylinder and having an outer periphery insertably provided with a plurality of oil seals, both ends of said piston extending to form a first action bar and a second action bar, which respectively pass through said axial through holes in said pair of cylinder covers;

a second tube having a front end and rear end fixedly secured at respective upper sides of said pair of cylinder covers, said second tube being provided with a plurality of vents formed in its bottom side for communicating with said first vents in said pair cylinder covers, said second tube further having through holes formed near its upper rear portion and upper middle portion;

a regulating rod disposed within said second tube and having a pair of valve elements located at suitable positions such that they communicate with said vents in the bottom side of said second tube, a spring being fitted at a rear end of said regulating rod behind one of said pair of valve elements;

a stop element fitted on a front end portion of said regulating rod for positioning said regulating rod in said second tube and controlling displacement of the regulating rod therein.

3. A damping device adapted for use in exercise apparatus, comprising:

a cylinder, having an internally threaded front end and an internally threaded rear end;

a pair of cylinder covers, each of said pair of cylinder covers having a threaded raised portion provided on an inner side thereof for engaging a respective one of said threaded front and rear ends of said cylinder, each of said pair of cylinder covers being provided with (1) a first vent which opens in an upper side thereof, (2) a second vent which opens in an outer side thereof, and (3) a valve hole formed therein and communicating with said first and second vents, one of said pair of cylinder covers having an axial through hole formed in a central portion thereof, said axial through hole having a plurality of oil seals disposed therein;

a pair of valves respectively disposed in said valve holes of said pair of cylinder covers, each of said pair of valves having an axial through hole connected to a first tube of a smaller diameter on an outer side thereof, said first tube being fitted into said first vent and being provided with a longitudinally oriented through hole in an upper rear side thereof;

a pair of C-clips for respectively positioning said pair of valves within their corresponding valve holes;

a piston disposed within said cylinder and having an outer periphery insertably provided with a plurality of oil seals, said piston having one end with an extend portion to form an action bar which passes through said axial through hole in said one cylinder cover;

a second tube having a front end and rear end fixedly secured at respective upper sides of said pair of cylinder covers, said second tube being provided with a plurality of vents formed in its bottom side for communicating with said first vents in said pair of cylinder covers, said second tube further having through holes formed near its upper rear portion and upper middle portion;

a regulating rod disposed within said second tube and having a pair of valve elements located at suitable positions such that they communicate with said vents in the bottom side of said second tube, a spring being fitted at a rear end of said regulating rod behind one of said pair of valve elements;

a stop element fitted on a front end portion of said regulating rod for positioning said regulating rod in said second tube and controlling displacement of the regulating rod therein.

* * * * *